Dec. 23, 1930.  O. E. JACQUES  1,786,346
CUTTING MACHINE
Filed March 14, 1929    2 Sheets-Sheet 1

WITNESSES
Edw. Thorpe
Chris Peinle

INVENTOR
O. E. Jacques
BY
ATTORNEY

Dec. 23, 1930.  O. E. JACQUES  1,786,346
CUTTING MACHINE
Filed March 14, 1929  2 Sheets-Sheet 2

WITNESSES
Edw. Thorpe
Chris Feinle

INVENTOR
O. E. Jacques
BY
ATTORNEY

Patented Dec. 23, 1930

1,786,346

UNITED STATES PATENT OFFICE

ORA E. JACQUES, OF PLYMOUTH, NEW HAMPSHIRE

CUTTING MACHINE

Application filed March 14, 1929. Serial No. 347,139.

This invention relates to a machine which is designed and adapted for cutting meat, for the purpose of rendering the meat as tender as possible.

The principal object of the invention is the provision of a machine of the indicated character of generally improved construction for carrying out meat cutting operations in a thorough and effectual manner.

The nature of the invention and its distinguishing features and advantages will appear when the following specification is read in connection with the accompanying drawing, in which Figure 1 is a side elevation of the machine shown partly in section, embodying the features of the present invention, portions of the machine being broken away.

Figure 1:
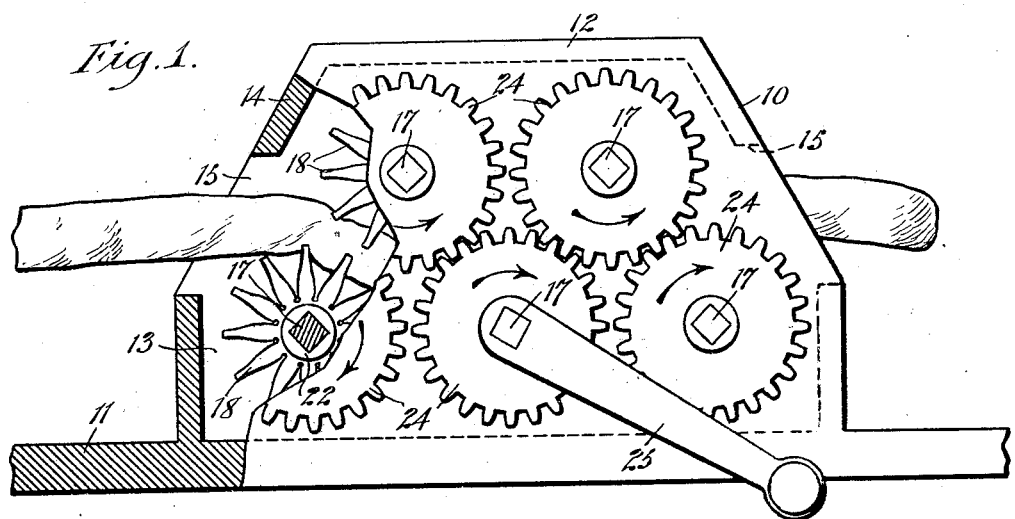
Figure 2:
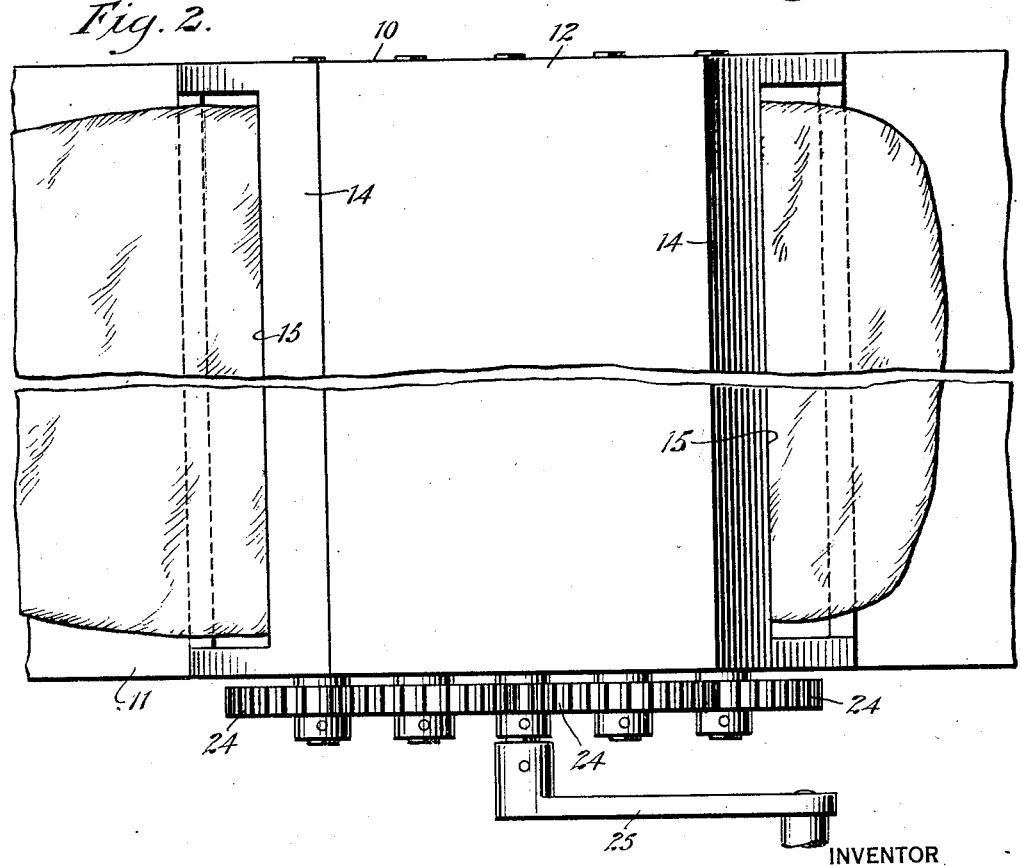
Fig. 2 is a plan view.
Figure 3:
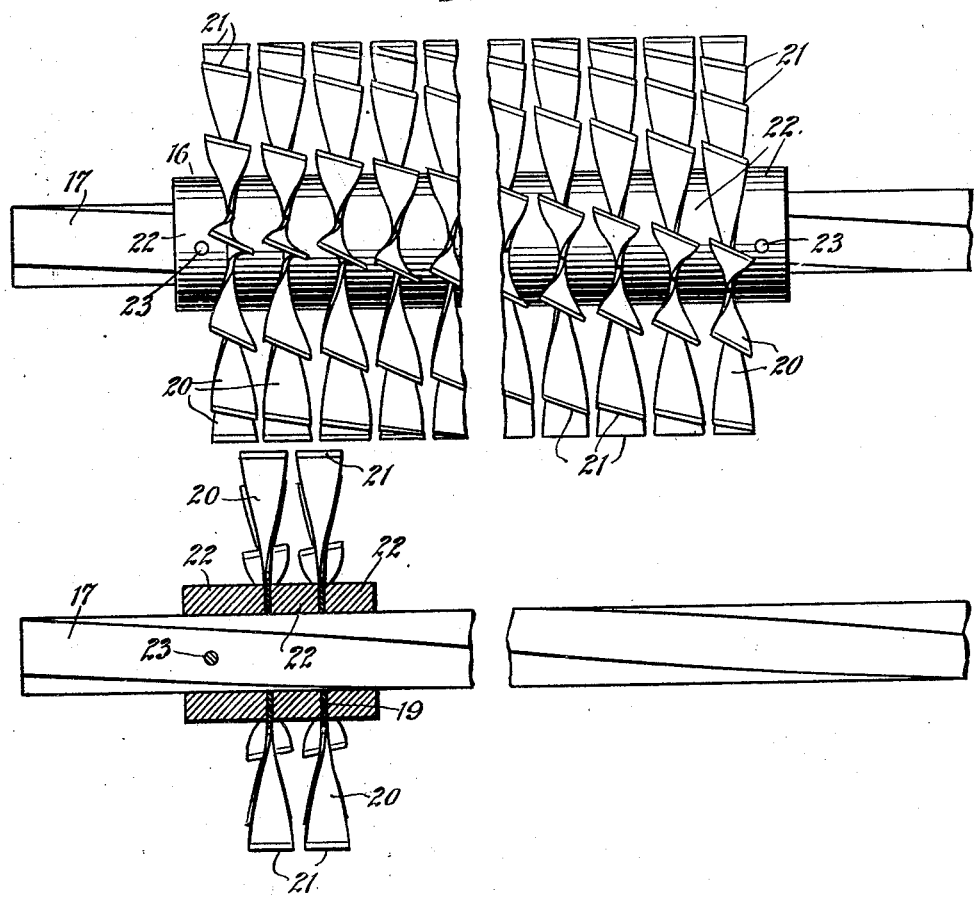
Fig. 3 is a fragmentary view of two of the cutting rolls, showing the relationship of the cutters, and parts of one of the rolls being shown in section.
Figure 4:
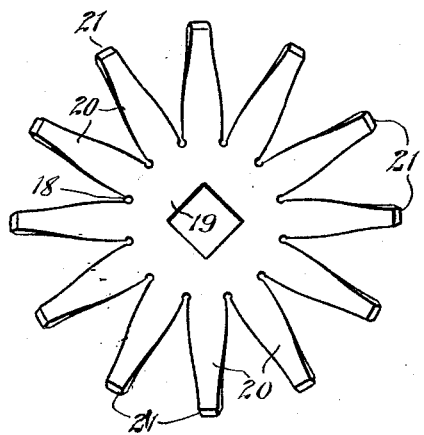
Fig. 4 is a side view of one of the cutters.

Referring now more particularly to the drawings, it will be apparent that in the illustrated embodiment of the invention there is shown a machine including a suitable casing 10 consisting of a base 11, top 12, sides 13 and end 14. Each end 14 has an opening 15, each of which may be optionally used to introduce a piece of meat or cut of steak into the casing to cutting rolls 16, while the other opening 15 allows it to pass from the casing.

Each of the rolls 16 includes a shaft 17 of cross-sectionally square twisted stock on which are arranged a series of cutters 18. Each cutter 18 consists of a central body 19 having a square hole, and radial blades 20, preferably twelve. Each blade 20 is sharpened to form a circumferentially cutting edge 21. A suitable number of cutters 18 are arranged on the shaft 17 and are held against relative longitudinal movement in spaced relationship on said shaft by collars 22, the outermost of which are secured to said shaft by pins or like fasteners 23. It will be understood that the cutters 18 rotate with the shaft 17.

In the present instance there are provided five rolls 16. Each roll 16 is supported for rotation by the sides 13 of the casing. The rolls 16 are arranged to present two upper rolls and three lower rolls, the axes of the former being between those of the latter. The cutting edges 21 of the cutters 18 of each roll are disposed in rows, the edges of each row being in alinement at an angle to the axis of the related shaft to present a spiral effect. The cutting edges of one roll are staggered with respect to the cutting edges of adjacent rolls. In general the cutting edges of all the rolls will be distributed to cut or chop the meat in opposite sides thereof, without severing portions thereof, to the fullest extent considering the number of cutters.

In order to rotate all of the cutting rolls simultaneously, and furthermore in order to rotate the two upper rolls in the same direction, and the three lower rolls in the same direction, but opposite to the direction of rotation of the upper rolls, there is provided means presently to be described. A gear 24 is secured to one end of each shaft 17, the gears 24 of the two upper rolls are in mesh with the gear 24 of the lower middle roll, and said gears 24 of the upper rolls are also in mesh respectively with the first and third lower rolls. The shaft 17 of the lower middle roll has secured thereto a crank handle 25 which may be operated to cause rotation of all of the rolls 16 through the intervention of said gears 24.

From the foregoing it will be apparent that a piece of meat or a cut of steak may be introduced into the casing through either the right or left one of the openings 15 between two of the rolls 16, and that by manipulating the crank handle 25 to either the right or left the meat or steak will be subjected to the cutting action of the edges 21 of the cutters of all of the rolls 16. It will also be apparent that the meat or steak will be prevented from wrapping around any one particular roll due to the relative disposition of the rolls; and that because of the fact that the cutting edges 21 of the cutters are arranged with a spiral effect and also a staggered relationship, the fibers of the meat or steak will be cut or chopped, yet without severing portions of the meat or steak, thereby rendering it tender as possible and to be more readily cooked.

I claim:

In a meat tendering machine, a group of upper shafts and a group of lower shafts, each shaft consisting of cross-sectionally square stock, a series of cutters arranged on each shaft, each cutter having a square shaft hole therein to receive its shaft to prevent relative turning of the cutter with respect to the shaft, each cutter having spaced circumferential cutting edges, each cutting edge being disposed at an angle with respect to the axis of rotation of the related shaft, and means to rotate the upper shafts in the same direction and said lower shafts in the same direction but oposite to the direction of rotation of the upper shafts, to cause the rotation of the cutters, for the purpose of cutting into the opposite sides of a piece of meat when subjected thereto by rotating said cutters.

ORA E. JACQUES.